(12) United States Patent
Tomizawa

(10) Patent No.: US 10,427,709 B2
(45) Date of Patent: Oct. 1, 2019

(54) ELECTRIC MOTOR AND ELECTRIC POWER STEERING APPARATUS HAVING THE SAME

(71) Applicant: DENSO CORPORATION, Kariya, Aichi-pref. (JP)

(72) Inventor: Hiroki Tomizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 203 days.

(21) Appl. No.: 15/421,710

(22) Filed: Feb. 1, 2017

(65) Prior Publication Data
US 2017/0225707 A1    Aug. 10, 2017

(30) Foreign Application Priority Data

Feb. 5, 2016 (JP) .................................. 2016-20967

(51) Int. Cl.
*B62D 5/04* (2006.01)
*H02K 11/30* (2016.01)
(Continued)

(52) U.S. Cl.
CPC ......... *B62D 5/0463* (2013.01); *B62D 5/0403* (2013.01); *B62D 5/0424* (2013.01); *B62D 6/10* (2013.01); *H02K 1/2706* (2013.01); *H02K 5/06* (2013.01); *H02K 5/10* (2013.01); *H02K 7/083* (2013.01); *H02K 7/116* (2013.01); *H02K 11/215* (2016.01); *H02K 11/30* (2016.01); *H02K 11/33* (2016.01)

(58) Field of Classification Search
CPC .. B62D 5/0463; B62D 5/0403; B62D 5/0424; B62D 6/10; H02K 11/215; H02K 11/30; H02K 11/33; H02K 1/2706; H02K 5/06
See application file for complete search history.

(56) References Cited

U.S. PATENT DOCUMENTS 6,674,188 B2 * 1/2004 Yockey ..................... H02K 5/20
310/52
6,680,552 B2 * 1/2004 Linden ..................... H02K 5/20
123/41.31
(Continued)

FOREIGN PATENT DOCUMENTS

JP            3716127 B2    11/2005
JP        2010-273494 A    12/2010
JP         2014-61754 A     4/2014

*Primary Examiner* — Tony H Winner
*Assistant Examiner* — Michael R Stabley
(74) *Attorney, Agent, or Firm* — Knobbe, Martens, Olson & Bear, LLP

(57) ABSTRACT

A frame is an aluminum die-cast product and includes a frame main body and a frame hole. The frame main body is placed at an inside of an opposite part of a case tubular portion, which is opposite from a case bottom portion. An outer wall of an outer peripheral portion of the frame main body is opposed to an inner wall of the case tubular portion. A receiving space is formed by the frame main body, the case tubular portion and the case bottom portion. The frame hole is formed in a center part of the frame main body. A stator is received in the receiving space. A rotor is rotatable together with a shaft. A seal member is placed between the case tubular portion and a housing of a rack gear and can liquid tightly seal between the case tubular portion and the housing.

15 Claims, 5 Drawing Sheets

(51) Int. Cl.

*B62D 6/10* (2006.01)
*H02K 1/27* (2006.01)
*H02K 5/06* (2006.01)
*H02K 5/10* (2006.01)
*H02K 7/08* (2006.01)
*H02K 7/116* (2006.01)
*H02K 11/215* (2016.01)
*H02K 11/33* (2016.01)

(56) References Cited

U.S. PATENT DOCUMENTS

| | | | | |
|---|---|---|---|---|
| 7,800,265 | B2* | 9/2010 | Nishikawa | B62D 5/0403 |
| | | | | 310/90 |
| 9,853,516 | B2* | 12/2017 | Taniguchi | H02K 5/15 |
| 2013/0099609 | A1* | 4/2013 | Ikeno | H02K 29/08 |
| | | | | 310/52 |
| 2015/0333586 | A1* | 11/2015 | Hirotani | H02K 29/03 |
| | | | | 310/68 D |
| 2016/0065027 | A1* | 3/2016 | Taniguchi | H02K 5/15 |
| | | | | 310/88 |
| 2016/0181885 | A1* | 6/2016 | Yamasaki | H02K 11/33 |
| | | | | 180/443 |
| 2016/0248292 | A1* | 8/2016 | Takarai | H02K 11/40 |
| 2016/0347352 | A1* | 12/2016 | Yoda | B62D 5/0403 |
| 2017/0066470 | A1* | 3/2017 | Asao | H02K 11/33 |

* cited by examiner

ELECTRIC MOTOR AND ELECTRIC POWER STEERING APPARATUS HAVING THE SAME

CROSS REFERENCE TO RELATED APPLICATION

This application is based on and incorporates herein by reference Japanese Patent Application No. 2016-20967 filed on Feb. 5, 2016.

TECHNICAL FIELD

The present disclosure relates to an electric motor and an electric power steering apparatus having the same.

BACKGROUND

Previously, there is known an electric motor that drives a drive subject installed at a lower side of a vehicle. For example, in a case of an electric motor disclosed in JP3716127B2, an antilock brake apparatus is a drive subject of the electric motor. This electric motor is installed at the lower side of the vehicle, so that a seal member, which is shaped into a ring form and is made of rubber, is installed between a case of the electric motor, which is shaped into a tubular form having a bottom, and a housing of the antilock brake apparatus, to limit intrusion of water into an inside of the case of the electric motor. A frame, which closes an opposite side of the case that is opposite from the bottom of the case, is placed in the inside of the case, and there is no seal member between the case and the frame. In the electric motor of JP3716127B2, the number of seal member(s) and the number of sealing location(s) are reduced in the above described manner.

In the electric motor of JP3716127B2, the case is formed through a press work of a deep drawing quality cold rolled steel plate (e.g., SPCE) into the tubular form having the bottom. Furthermore, since the frame is configured to be fitted to the case, it is assumed that the frame is made of iron. In contrast, the housing of the antilock brake apparatus is made of metal and is formed as a solid block body, so that it is assumed that the housing of the antilock brake apparatus is an aluminum die-cast product.

In the electric motor of JP3716127B2, since a wall thickness of the case is small, it is difficult to form a seal groove, which receives a seal member, at the case. Thus, a selection of an installation subject may possibly be narrowly limited.

Furthermore, in the case where the seal member is compressed with the case having the small wall thickness like in the case of the electric motor of JP3716127B2, there is a possibility of that the case is deformed by a reaction force of the seal member. Therefore, there is a possibility of that the sealing performance is deteriorated at a circumferential location(s) of the case. Furthermore, when the case is formed by the press work, a degree of flatness of a seal surface of the case is relatively low. Therefore, it may be difficult to increase the sealing performance of the seal member.

Furthermore, in the electric motor of JP3716127B2, since the case is made of the steel plate, it is required to apply a surface treatment for limiting generation of rust at an outer wall of the case.

SUMMARY

The present disclosure is made in view of the above points. According to the present disclosure, there is provided an electric motor for driving a drive subject. The electric motor includes a case, a frame, a stator, a winding, a shaft, a rotor and a seal member. The case is an aluminum die-cast product and includes a case tubular portion and a case bottom portion. The case tubular portion is shaped into a tubular form. The case bottom portion closes one end part of the case tubular portion. The frame is an aluminum die-cast product and includes a frame main body and a frame hole. The frame main body is placed at an inside of an opposite part of the case tubular portion, which is opposite from the case bottom portion. An outer wall of an outer peripheral portion of the frame main body is opposed to an inner wall of the case tubular portion, and a receiving space is formed by the frame main body, the case tubular portion and the case bottom portion. The frame hole is formed in a center part of the frame main body. The stator is shaped into a ring form and is received in the receiving space. The stator is coaxial with the case tubular portion and is not rotatable relative to the case tubular portion. The winding is wound around the stator. The shaft is inserted through the frame hole and is rotatably supported by a center part of the case bottom portion and the frame hole. The rotor is rotatable together with the shaft. An outer wall of the rotor is opposed to an inner wall of the stator, and an inner wall of the rotor is fixed to an outer wall of the shaft. The seal member is placed between the case tubular portion and the drive subject and liquid tightly seals between the case tubular portion and the drive subject.

BRIEF DESCRIPTION OF THE DRAWINGS

The drawings described herein are for illustration purposes only and are not intended to limit the scope of the present disclosure in any way.

DETAILED DESCRIPTION

Hereinafter, various embodiments of an electric motor and an electric power steering apparatus having the same according to the present disclosure will be described with reference to the accompanying drawings. In the following embodiments, components or portions, which are substantially identical to each other, will be indicated by the same reference signs and will not be described redundantly for the sake of simplicity.

First Embodiment

Figure 2:
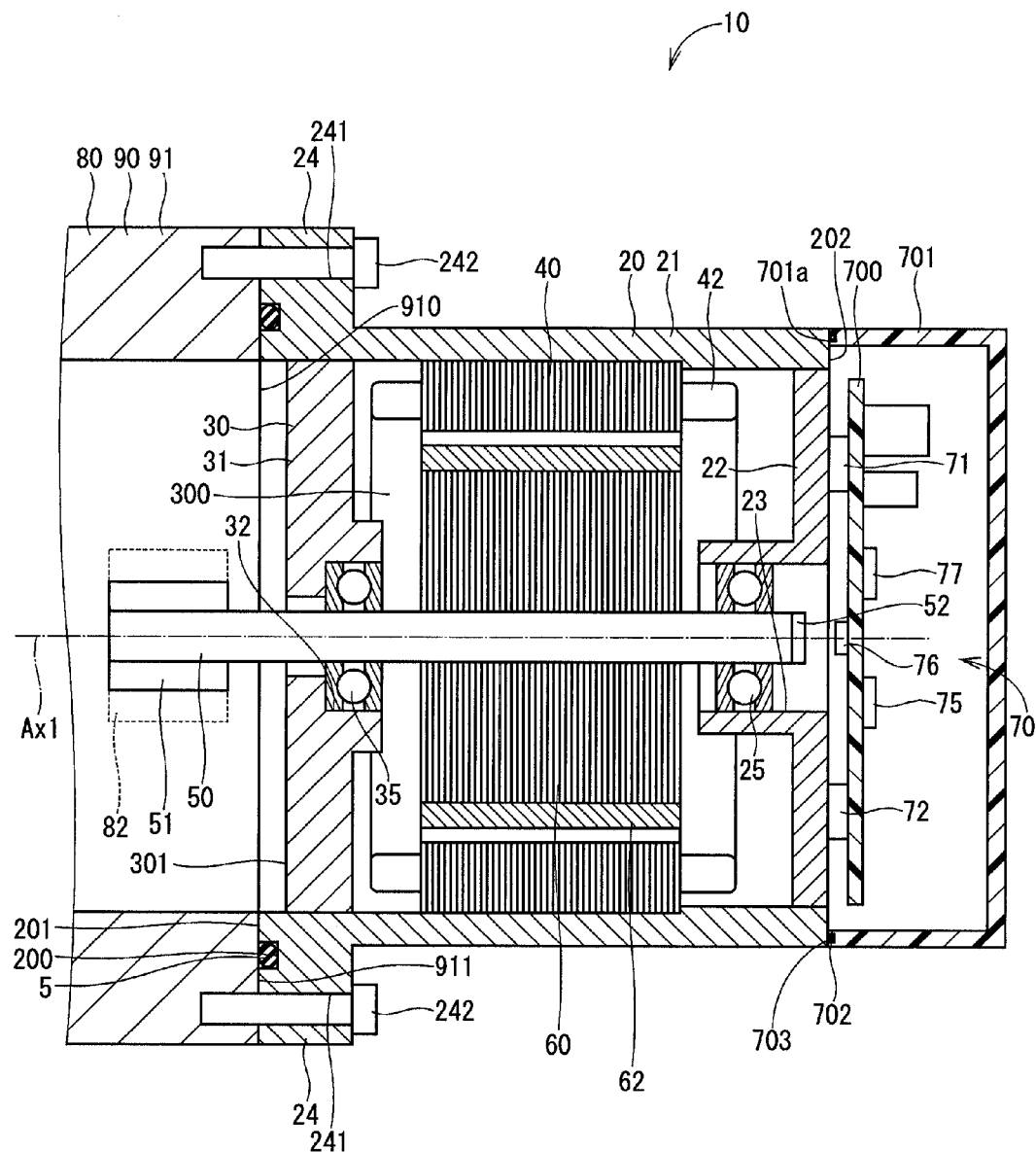
FIG. 2 is a cross sectional view of the electric motor of the first embodiment.

FIG. 2 shows the electric motor of the first embodiment of the present disclosure. The electric motor (hereinafter simply referred to as "motor") 10 is driven when an electric power is supplied to the motor 10. The motor 10 is used in, for example, an electric power steering apparatus that assists a steering operation of a vehicle.

Figure 1A:
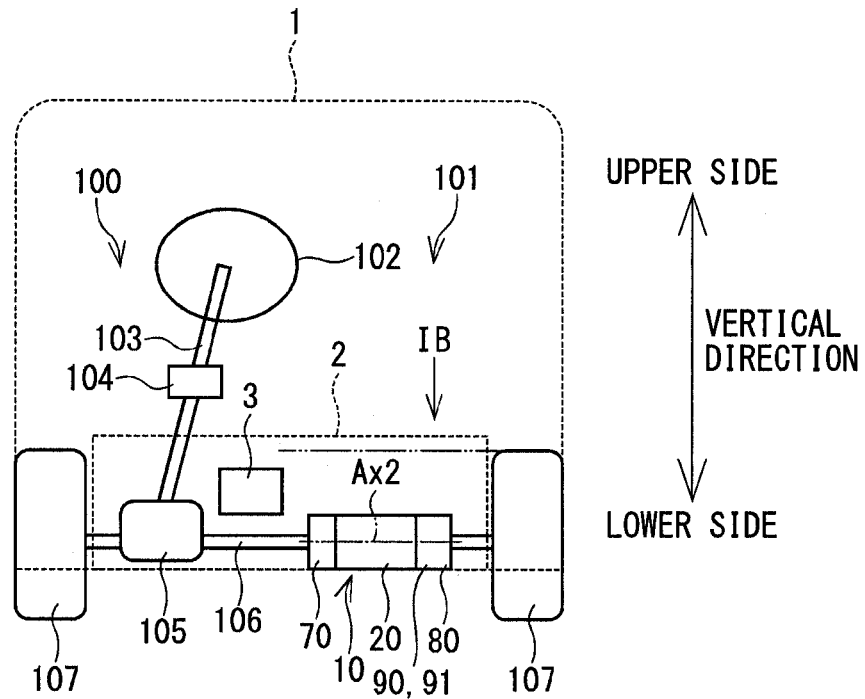
FIG. 1A is a schematic diagram showing an electric motor installed in an electric power steering apparatus according to a first embodiment of the present disclosure.

FIG. 1A indicates an entire structure of a steering system 100 that has the electric power steering apparatus 101. The electric power steering apparatus 101 includes a torque sensor 104 that is installed to a steering shaft 103 connected to a steering wheel 102. The torque sensor 104 senses a steering torque that is inputted from a driver of the vehicle 1 to the steering shaft 103 through the steering wheel 102.

A pinion gear 105 is installed to a distal end part of the steering shaft 103 and is meshed with a rack shaft 106. Two wheels 107 are rotatably coupled to two ends, respectively, of the rack shaft 106 through, for example, tie rods.

Thereby, when the driver rotates the steering wheel 102, the steering shaft 103, which is connected to the steering wheel 102, is rotated. Then, the rotational motion of the steering shaft 103 is converted into linear motion of the rack shaft 106 to steer the wheels 107 by an angle that corresponds to the linear motion of the rack shaft 106.

The electric power steering apparatus 101 includes the motor 10 and a rack gear 80. The motor 10 generates an assist torque for the steering of the vehicle 1. The rack gear 80 reduces a rotational speed of the rotation transmitted from the motor 10 and transmits the rotation of the reduced rotational speed to the rack shaft 106. In the present embodiment, the motor 10 is installed to a housing 90 of the rack gear 80.

The motor 10 is installed in, for example, an engine room 2 of the vehicle 1. The motor 10 is, for example, a three-phase brushless motor and is rotated when the electric power is supplied from a battery 3 to the motor 10. The motor 10 rotates the rack gear 80 in a normal rotational direction or a reverse rotational direction, which are opposite to each other. The rack gear 80 serves as a drive subject of the present disclosure. The electric power steering apparatus 101 includes the torque sensor 104 described above and a vehicle speed sensor that senses a traveling speed of the vehicle 1.

With the above described construction, in the electric power steering apparatus 101, the motor 10 generates the assist torque, which assists the steering operation of the steering wheel 102, based on signals outputted from the torque sensor 104 and the vehicle speed sensor, and the assist torque generated by the motor 10 is transmitted to the rack shaft 106 through the rack gear 80. As discussed above, in the present embodiment, the electric power steering apparatus 101 is a rack assist type electric power steering apparatus.

As shown in FIG. 2, the motor 10 includes a case 20, a frame 30, a stator 40, windings 42, a shaft 50, a rotor 60, a seal member 5, a case side fixing members 242 and a control device 70.

The case 20 is made of, for example, metal, such as aluminum alloy, which includes aluminum. In the present embodiment, the case 20 is, for example, an aluminum die-cast product. The case 20 includes a case tubular portion 21, a case bottom portion 22 and a case hole 23. The case tubular portion 21 is shaped into a tubular form. The case bottom portion 22 closes one end part of the case tubular portion 21. The case hole 23 is formed at a center part of the case bottom portion 22. In the present embodiment, the case bottom portion 22 is shaped into a plate form. The case tubular portion 21 and the case bottom portion 22 are formed separately from each other. Specifically, the case bottom portion 22 is fitted into an inside of the case tubular portion 21. The case hole 23 extends through the case bottom portion 22 in a plate thickness direction (i.e., a direction perpendicular to a plane of the case bottom portion 22). In the present embodiment, the case tubular portion 21 is shaped into a generally cylindrical tubular form.

The case tubular portion 21 includes a case side fixation portion 24 that radially outwardly extends from an outer wall (outer peripheral wall) of an end part of the case tubular portion 21, which is opposite from the case bottom portion 22. Case side insertion holes 241 are formed in the case side fixation portion 24.

A bearing 25 is installed to the case hole 23. The bearing 25 is, for example, a ball bearing.

The frame 30 is made of metal, such as aluminum alloy, which includes aluminum. In the present embodiment, the frame 30 is, for example, an aluminum die-cast product. The frame 30 is placed at an inside of the opposite part of the case tubular portion 21, which is opposite from the case bottom portion 22.

The frame 30 includes a frame main body 31 and a frame hole 32. An outer wall (outer peripheral wall) of an outer peripheral portion of the frame main body 31 is opposed to an inner wall (inner peripheral wall) of the case tubular portion 21 in a radial direction. A receiving space 300 is formed by the frame main body 31, the case tubular portion 21 and the case bottom portion 22. The frame hole 32 is formed at a center part of the frame main body 31. In the present embodiment, the frame main body 31 is shaped into a generally circular plate form. In the present embodiment, the outer wall of the frame main body 31 is fitted to the inner wall of the case tubular portion 21. An end surface 301 of the frame main body 31, which is opposite from the case bottom portion 22, is placed in the inside of the case tubular portion 21.

A bearing 35 is installed to the frame hole 32. Similar to the bearing 25, the bearing 35 is a ball bearing.

The stator 40 is shaped into a ring form and is formed by stacking, thin plates made of, for example, iron. The stator 40 is placed in the receiving space 300 such that an outer wall (outer peripheral wall) of the stator 40 is fitted to the inner wall (inner peripheral wall) of the case tubular portion 21. Specifically, the stator 40 is shaped into a ring form and is received in the receiving space 300 such that the stator 40 is coaxial with the case tubular portion 21 and is not rotatable relative to the case tubular portion 21.

The windings 42 are made of metal, such as copper, and are wound around the stator 40.

The shaft 50 is shaped into a rod form and is made of, for example, metal. The shaft 50 is rotatably supported by the bearing 25 and the bearing 35. Specifically, the shaft 50 is inserted through the frame hole 32 and is rotatably supported by the center of the case bottom portion 22 and the frame hole 32 through the bearing 25 and the bearing 35.

The rotor 60 is shaped into a tubular form and is formed by stacking, thin plates made of, for example, iron. An outer wall (outer peripheral wall) of the rotor 60 is opposed to an inner wall (inner peripheral wall) of the stator 40, and an inner wall (inner peripheral wall) of the rotor 60 is fixed to an outer wall (outer peripheral wall) of the shaft 50. Thereby, the rotor 60 is rotatable integrally with the shaft 50.

Magnets 62 are installed to the outer wall (outer peripheral wall) of the rotor 60. The magnets 62 are installed to the rotor 60 such that the magnets 62 are opposed to the inner wall (inner peripheral wall) of the stator 40. The magnets 62 are permanent magnets made of, for example, rare-earth element. The magnets 62 are provided as a plurality of magnets installed to the outer wall (outer peripheral wall) of the rotor 60. The magnets 62 are arranged one after another at equal intervals in the circumferential direction of the rotor 60. In the present embodiment, the magnets 62 are joined to the outer wall (outer peripheral wall) of the rotor 60 by, for example, a bonding agent.

The seal member 5 is shaped into a ring form and is made of an elastic member (resilient member), such as rubber. Specifically, the seal member 5 is an O-ring. The seal member 5 is installed between the case tubular portion 21 and the housing 90 of the rack gear 80.

In the present embodiment, a case side seal groove 200 is formed in an end surface 201 of the case side fixation portion 24 of the case tubular portion 21, which is opposite from the case bottom portion 22. The case side seal groove 200 is in a form of an annular recess that is shaped in conformity with the shape of the seal member 5. Here, the end surface 201 is formed into a planar surface.

The seal member 5 is received in the case side seal groove 200.

Figure 1B:
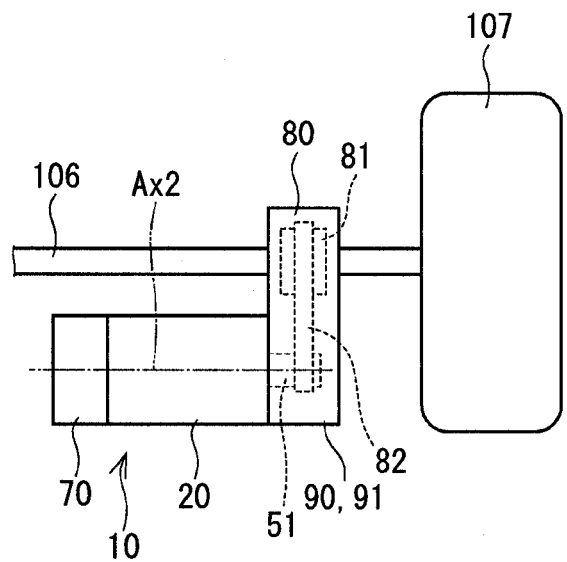
FIG. 1B is an enlarged partial view taken in a direction of an arrow IB in FIG. 1A.

As shown in FIG. 2, the case 20 is fixed to the housing 90 of the rack gear 80. The housing 90 is, for example, an aluminum die-cast product. The housing 90 includes a housing main body 91. The housing main body 91 is shaped into a box form and receives a pulley 81 and a belt 82 (see FIGS. 1B and 2). The pulley 81 serves as an input portion of the rack gear 80. The belt 82 is wound around the pulley 81. An opening 910 is formed in the housing main body 91. An outer wall of the housing main body 91, which is located on the radially outer side of the opening 910, includes a surface 911. The surface 911 is formed as a planar surface.

The case 20 is fixed to the rack gear 80 such that an end part of the shaft 50, which is opposite from the case bottom portion 22, is inserted through the opening 910, and the end surface 201 contacts the surface 911 of the housing main body 91. The case side fixation portion 24 is fixed to the rack gear 80 by inserting the case side fixing members 242 through the case side insertion holes 241, respectively and threadably tightening the case side fixing members 242 into female-threaded holes, respectively, of the housing 90 of the rack gear 80. In the present embodiment, each of the case side fixing members 242 is, for example, a bolt.

At the time of fixing the case 20 to the housing 90 of the rack gear 80, the seal member 5 is compressed in the case side seal groove 200 in the axial direction of the case tubular portion 21. In this way, the gap between the case tubular portion 21 and the housing 90 is liquid tightly sealed.

A pulley 51 is installed to the end part of the shaft 50, which is located on the rack gear 80 side. The pulley 51 is shaped into a cylindrical tubular form and is made of, for example, metal. The pulley 51 is rotatable together with the shaft 50. A plurality of grooves (not shown), which extend in the axial direction, is formed at an outer wall of the pulley 51. The belt 82 is wound around the pulley 81, which serves as the input portion of the rack gear 80, and the pulley 51. Thereby, when the rotor 60 is rotated, the shaft 50 and the pulley 51 are rotated. Thereby, the rotation of the rotor 60 is outputted from the pulley 51 to the rack gear 80.

A magnet 52 is installed to an end part of the shaft 50, which is opposite from the pulley 81. When the rotor 60 is rotated, the magnet 52 is rotated together with the shaft 50.

As shown in FIG. 2, the control device 70 is placed on an opposite side of the case bottom portion 22, which is opposite from the frame 30. The control device 70 can control rotation of the rotor 60 by controlling the electric power supplied to the windings 42.

The control device 70 includes power modules 71, 72, a custom IC 75, a rotational angle sensor 76, a control IC 77 and a circuit board 700.

The power module 71 is a semiconductor module that is integrally formed by covering a plurality of switching devices, an electric power source relay and a shunt resistor with a seal body, such as resin.

Similar to the power module 71, the power module 72 is a semiconductor module that is integrally formed by covering a plurality of switching devices, an electric power source relay and a shunt resistor with a seal body, such as resin.

In the present embodiment, the windings 42 include two winding sets. The power modules 71, 72 are formed to respectively correspond to the two winding sets.

The custom IC 75 is a semiconductor integrated circuit that includes a regulator and a rotational angle sensor signal amplifier.

The regulator is a regulated power supply circuit that stabilizes the electric power received from the battery 3. The regulator stabilizes the electric power that is supplied to the respective corresponding elements.

A signal of the rotational angle sensor 76 (see FIG. 2) is inputted to the rotational angle sensor signal amplifier. The rotational angle sensor 76 is a magnetic flux sensing device, such as a Hall IC. The rotational angle sensor 76 is placed on the circuit board 700 described later at a location that is adjacent to the magnet 52, which is installed to the shaft 50. More specifically, the rotational angle sensor 76 is placed along an axis Ax1 of the shaft 50 such that the rotational angle sensor 76 opposes the magnet 52 (see FIG. 2). The rotational angle sensor 76 senses a magnetic flux, which is generated at the magnet 52. More specifically, the rotational angle sensor 76 senses a change in the magnetic flux (magnetic field) around the rotational angle sensor 76 and transmits a sensed value of the rotational angle sensor 76 to the rotational angle sensor signal amplifier as a signal that relates to a rotational angle of the rotor 60. The rotational angle sensor signal amplifier amplifies the signal, which is transmitted from the rotational angle sensor 76 and relates to the rotational angle of the rotor 60, and the rotational angle sensor signal amplifier outputs this amplified signal to a microcomputer of the control IC 77 described later.

The control IC 77 is a semiconductor integrated circuit that includes the microcomputer and a pre-driver.

The microcomputer is a small computer that includes a CPU (serving as a computing means), a ROM and a RAM (serving as a storage means). The microcomputer executes various processes through the CPU according to various programs stored in the ROM.

The control IC 77 can sense the rotational angle of the rotor 60 based on the signal outputted from the rotational angle sensor 76.

The microcomputer receives the signal, which is outputted from the rotational angle sensor signal amplifier and relates the rotational angle of the rotor 60. The microcomputer also receives a steering torque signal, which is outputted from the torque sensor 104, and vehicle speed information, which is transmitted from a controller area network (CAN). When the microcomputer receives these signals, the microcomputer controls the power modules 71, 72 through the pre-driver based on the rotational angle of the rotor 60. More specifically, the microcomputer controls the power modules 71, 72 by switching each corresponding switching device through turning on or off of the switching device that is executed by changing a gate voltage of the switching device through the pre-driver.

The microcomputer generates a pulse signal that is formed through a PWM control operation via the pre-driver in such a manner the steering operation of the steering wheel 102 is assisted according to the vehicle speed based on the signal of the rotational angle sensor 76, the signal of the torque sensor 104 and the vehicle speed information transmitted through the CAN. This pulse signal is outputted to inverter circuits of two systems, which are formed by the power modules 71, 72, to control the switching between on and off of the respective switching devices of the power modules 71, 72. In this way, sinusoidal alternating currents, which have different phases, respectively, are conducted thought the windings of the different phases, so that a rotating magnetic field is generated. The rotor 60 and the shaft 50 are integrally rotated by this rotating magnetic field. A drive force is outputted from the pulley 51 to the rack gear 80 through the rotation of the shaft 50, so that the steering operation of the steering wheel 102 by the driver is assisted.

As described above, according to the present embodiment, the control device 70 includes the power modules 71, 72 of the two systems and controls the supply of the electric power to the windings 42. The phases discussed above include a U-phase, a V-phase and a W-phase. The power modules 71, 72 convert the direct current to the alternating current and supply the converted alternating current to the windings 42. The power modules 71, 72 generate the heat at the time of operation (switching operation) thereof.

In the present embodiment, the power modules 71, 72 are installed to the circuit board 700 such that the power modules 71, 72 contact the case bottom portion 22. Therefore, the heat, which is generated at the time of operating the power modules 71, 72, is conducted to the case bottom portion 22 and the case tubular portion 21 and is released to its surrounding. Specifically, the case bottom portion 22 serves as a heat sink.

A cover 701 is installed on an opposite side of the control device 70, which is opposite from the case tubular portion 21. The cover 701 is shaped into a dish form and is made of, for example, resin. The cover 701 is placed on the control device 70 side of the case tubular portion 21 such that the cover 701 covers the control device 70 that is placed in an inside of the cover 701. The cover 701 is formed such that an end surface 701a of the cover 701, which is located at an opening of the cover 701, contacts an end surface 202 of the case tubular portion 21, which is located at the case bottom portion 22 side. The cover 701 can protect the control device 70 from external shock, dust and/or liquid (e.g., water) to be applied from an outside of the cover 701. A seal groove 703, which is shaped into a ring form, is formed in the end surface 201 of the cover 701, which is located at the opening of the cover 701. A seal member 702, which is shaped into a ring form and is made of rubber, is received in the seal groove 703. Thereby, the gap between the case 20 and the cover 701 is liquid tightly sealed.

In the present embodiment, as shown in FIG. 1, the motor 10 is installed to the housing 90 of the rack gear 80 in such a manner that an axis Ax2 of the case tubular portion 21 and the rack shaft 106 are generally parallel to each other. Furthermore, the motor 10 is placed on a lower side of an upper end of a silhouette of the right or left wheel 107 of the vehicle 1 in the vertical direction. In FIG. 1A, the silhouette of the wheel 107 is formed by projecting, for example, the right wheel 107 in the axial direction of the rack shaft 106, and the upper end of this silhouette of the right wheel 107 is indicated by a dot-dot dash line in FIG. 1A. Therefore, at the time of driving the vehicle 1, muddy water or salt water (e.g., snow-melting salt water for melting snow at a snowy region or salt water adhered to sand at a coast) may possibly be frequently applied to the motor 10.

As discussed above, (1) the motor 10 of the present embodiment drives the rack gear 80 as the drive subject and includes the case 20, the frame 30, the stator 40, the windings 42, the shaft 50, the rotor 60 and the seal member 5.

The case 20 is the aluminum die-cast product and includes the case tubular portion 21, which is shaped into the tubular form, and the case bottom portion 22, which closes the one end part of the case tubular portion 21.

The frame 30 is the aluminum die-cast product and includes the frame main body 31 and the frame hole 32. The frame main body 31 is placed at the inside of the opposite part of the case tubular portion 21, which is opposite from the case bottom portion 22. The outer wall (outer peripheral wall) of the outer peripheral portion of the frame main body 31 is opposed to the inner wall (inner peripheral wall) of the case tubular portion 21. The receiving space 300 is formed by the frame main body 31, the case tubular portion 21 and the case bottom portion 22. The frame hole 32 is formed in the center part of the frame main body 31.

The stator 40 is shaped into the ring form and is received in the receiving space 300 such that the stator 40 is coaxial with the case tubular portion 21 and is not rotatable relative to the case tubular portion 21.

The windings 42 are wound around the stator 40.

The shaft 50 is inserted through the frame hole 32 and is rotatably supported by the center part of the case bottom portion 22 and the frame hole 32.

The outer wall (outer peripheral wall) of the rotor 60 is opposed to the inner wall (inner peripheral wall) of the stator 40, and the inner wall (inner peripheral wall) of the rotor 60 is fixed to the outer wall (outer peripheral wall) of the shaft 50. Thereby, the rotor 60 is rotatable integrally with the shaft 50.

The seal member 5 is placed between the case tubular portion 21 and the housing 90 of the rack gear 80 and can liquid tightly seal between the case tubular portion 21 and the housing 90.

In the present embodiment, the case 20 is the aluminum die-cast product. Therefore, a wall thickness of the case 20 is relatively large, and thereby the seal groove (the case side seal groove 200), which receives the seal member 5, can be easily formed at the case 20. Thus, it is not required to form the seal groove at the rack gear 80, and thereby the installation subject can be selected from a wider range of installation subjects.

Furthermore, the seal member 5 is compressed with the case 20, which has the relatively large wall thickness, so that deformation of the case 20, which would be otherwise caused by a reaction force of the seal member 5, can be limited. In this way, it is possible to limit deterioration of the sealing performance at a circumferential location(s) of the case 20. Furthermore, in the case where the case 20 is the aluminum die-cast product, a degree of flatness of the seal surface is high. Therefore, the sealing performance can be improved with the seal member 5. Thus, intrusion of the water into the inside of the case 20 can be effectively limited.

Furthermore, in the present embodiment, since the case 20 is the aluminum die-cast product, the rust resistance (corrosion resistance) of the case 20 can be improved in comparison to the case where the case 20 is made of, for example, a steel plate.

Furthermore, in the present embodiment, the seal member 5 is placed between the case tubular portion 21 and the rack gear 80, so it is not required to provide a seal between the case tubular portion 21 and the frame 30. Therefore, the number of the seal members can be reduced.

Furthermore, (2) in the present embodiment, the case tubular portion 21 includes the case side seal groove 200, which can receive the seal member 5. Thus, it is not required to form the seal groove at the rack gear 80, and thereby the installation subject can be selected from a wider range of installation subjects.

Furthermore, (3) in the present embodiment, the case side seal groove 200 is formed at the end surface 201 of the case tubular portion 21, which is opposite from the case bottom portion 22. In the present embodiment, since the case 20 is the aluminum die-cast product, a degree of flatness of the end surface 201 can be easily increased. Therefore, the sealing performance for sealing between the case 20 and the rack gear 80 can be improved.

Furthermore, in the present embodiment, the case tubular portion 21 further includes the case side fixation portion 24 that radially outwardly extends from the outer wall of the end part of the case tubular portion 21, which is opposite from the case bottom portion 22, and the case side fixation portion 24 is fixed to the housing 90 of the rack gear 80. In the present embodiment, since the case 20 is the aluminum die-cast product, the sufficient wall thickness of the case side fixation portion 24 can be ensured. Thereby, the motor 10 can be stably fixed to the rack gear 80.

Furthermore, (7) in the present embodiment, the case side fixation portion 24 includes the case side insertion holes 241. In the present embodiment, the motor 10 further includes the case side fixing members 242 that are inserted through the case side insertion holes 241 and fixe the case side fixation portion 24 to the rack gear 80. In the present embodiment, since the case 20 is the aluminum die-cast product, the sufficient wall thickness of the case side fixation portion 24 can be ensured. Thereby, deformation of the case side fixation portion 24 can be limited even when a reaction force is applied from the seal member 5 to the case side fixation portion 24. Therefore, it is possible to limit deterioration of the sealing performance at the circumferential location(s) of the case 20.

Furthermore, (10) in the present embodiment, the motor 10 includes the control device 70 that is placed on the side of the case bottom portion 22, which is opposite from the frame 30. The control device 70 can control the rotation of the rotor 60 by controlling the electric power supplied to the windings 42. That is, the motor of the present embodiment is a motor of an electro-mechanical type. Therefore, the control device 70, which is integrated with the case 20 of the motor 10, can be effectively installed in the engine room 2 that has a limited space.

Furthermore, (11) in the present embodiment, the case tubular portion 21 and the case bottom portion 22 are formed separately from each other. Therefore, the case tubular portion 21 and the case bottom portion 22 can be separately formed by the die-casting. Thus, in comparison to the case where the case tubular portion 21 and the case bottom portion 22 are formed integrally as a one-piece component, a degree of freedom of the shape of the case bottom portion 22 can be improved.

Furthermore, (13) the electric power steering apparatus 101 of the present embodiment is installed in the vehicle 1 and includes the motor 10 described above and the rack gear 80. The rack gear 80 is connected to the pulley 51 installed to the end part of the shaft 50, which is opposite from the case bottom portion 22. The rack gear 80, which serves as the drive subject, is driven by the motor 10. When the rack gear 80 is driven, an assist torque for steering the vehicle 1 is outputted from the electric power steering apparatus.

Furthermore, (14) in the present embodiment, the rack gear 80 drives the rack shaft 106 that is connected to the wheels 107 of the vehicle 1.

Furthermore, (15) in the present embodiment, the motor 10 is placed on the lower side of the upper end of the silhouette of the wheel 107 of the vehicle 1 in the vertical direction. Therefore, at the time of driving the vehicle 1, the water may possibly be frequently applied to the motor 10. However, the motor 10 of the present embodiment can effectively limit intrusion of the water into the inside of the motor 10, and the rust resistance of the motor 10 is also high. Thus, the motor 10 of the present embodiment is suitable as the motor of the electric power steering apparatus 101, to which the water may possibly be frequently applied at the time of driving the vehicle 1.

Second Embodiment

Figure 3A:
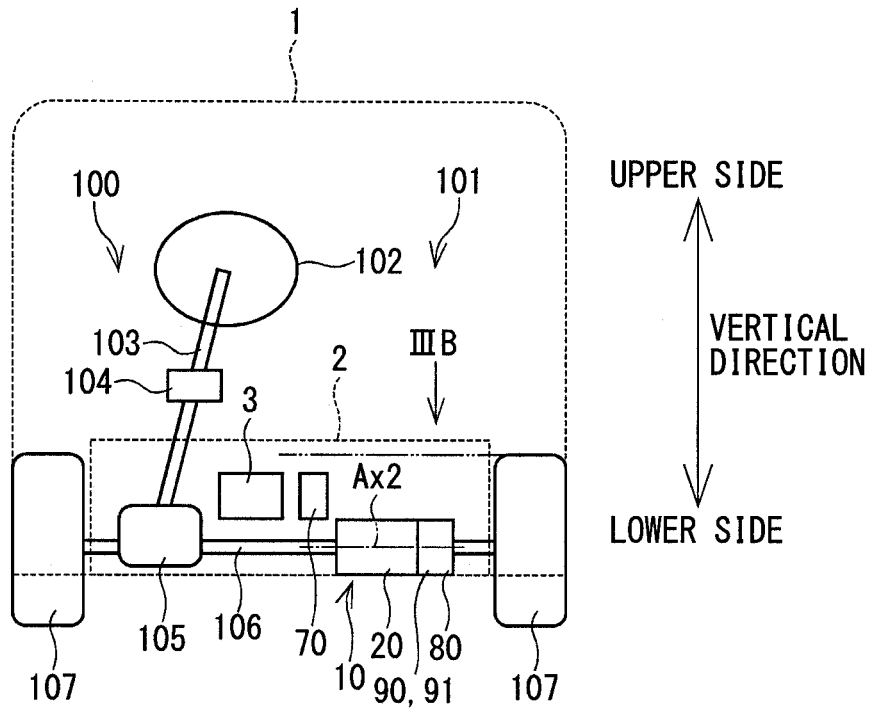
FIG. 3A is a schematic diagram showing an electric motor installed in an electric power steering apparatus according to a second embodiment of the present disclosure.
Figure 3B:
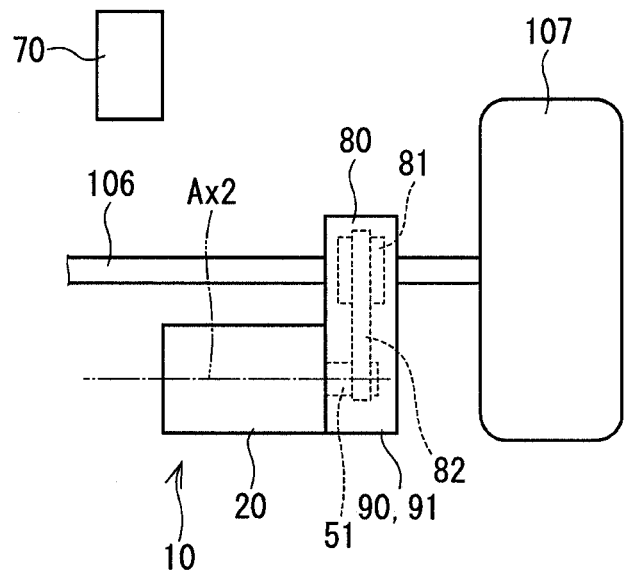
FIG. 3B is an enlarged partial view taken in a direction of an arrow IIIB in FIG. 3A.
Figure 4:
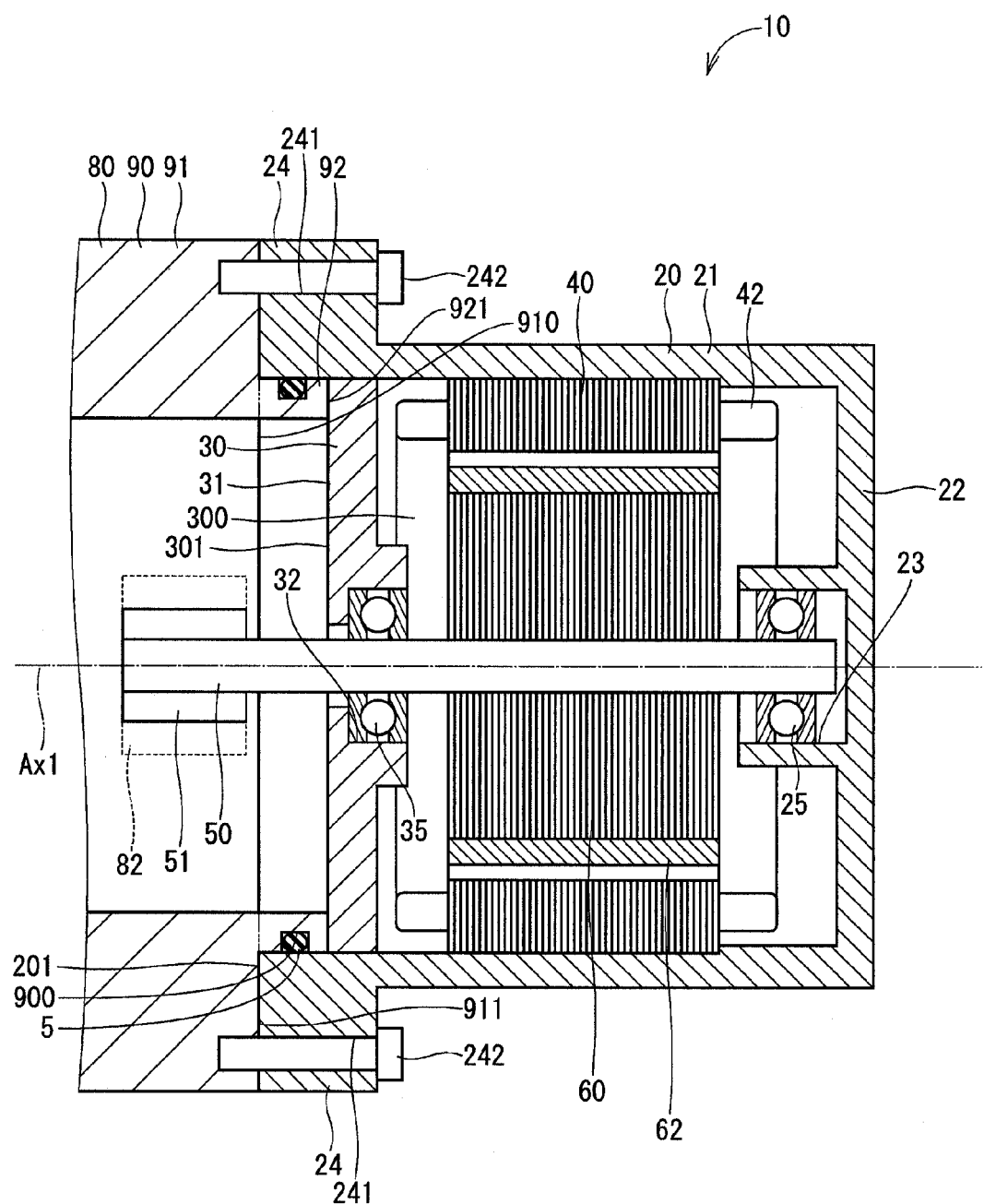
FIG. 4 is a cross sectional view of the electric motor of the second embodiment.

FIGS. 3A to 4 indicate the motor according to a second embodiment of the present disclosure. The second embodiment differs from the first embodiment with respect to that the control device 70 is provided separately from the motor 10, and the motor 10 includes the rack gear 80.

In the second embodiment, the control device 70 is provided separately from the case 20 of the motor 10 (see FIGS. 3A and 3B). Specifically, the motor 10 of the present embodiment is an electric motor of a controller-separated type (i.e., an electric motor formed separately from an electronic control device or an electronic controller).

Furthermore, the case bottom portion 22 is formed integrally with the case tubular portion 21 as a one-piece body. Furthermore, an end of the case hole 23, which is opposite from the frame 30, is closed.

The motor 10 of the present embodiment further includes the rack gear 80. The housing 90 of the rack gear 80 includes the housing main body 91 and a housing tubular portion 92.

The housing tubular portion 92 projects in a generally cylindrical tubular form from the surface 911 of the outer wall of the housing main body 91, which is located on the radially outer side of the opening 910. An outer diameter of the housing tubular portion 92 is set to be equal to or slightly smaller than an outer diameter of the case tubular portion 21. An outer wall (outer peripheral wall) of the housing tubular portion 92 is opposed to the inner wall (inner peripheral wall) of the opposite part of the case tubular portion 21, which is located on the opposite side of the frame main body 31 that is opposite from the case bottom portion 22.

In the present embodiment, the case 20 is fixed to the housing 90 of the rack gear 80 with the case side fixing members 242 such that the end part of the shaft 50, which is opposite from the case bottom portion 22, is inserted through the opening 910, and the housing tubular portion 92 is placed at the inside of the case tubular portion 21 while the end surface 201 contacts the surface 911 of the housing main body 91.

As discussed above, in the present embodiment, the case 20 is fixed to the housing 90 of the rack gear 80 while the case tubular portion 21, which is shaped into the generally cylindrical tubular form, and the housing tubular portion 92 are fitted together to position the case 20 relative to the housing 90. That is, the case 20 is fixed to the rack gear 80 by socket-spigot fitting.

A housing side seal groove 900 is formed at the housing tubular portion 92. The housing side seal groove 900 is formed in an outer wall (outer peripheral wall) of the housing tubular portion 92 to extend all around the housing tubular portion 92 in the circumferential direction. In the present embodiment, the seal member 5 is received in the housing side seal groove 900.

At the time of fixing the case 20 to the housing 90 of the rack gear 80, the seal member 5 is compressed in the housing side seal groove 900 in the radial direction of the case tubular portion 21. In this way, the gap between the case tubular portion 21 and the housing 90 is liquid tightly sealed.

In the present embodiment, the case 20 is fixed to the rack gear 80 such that the end surface 301 of the frame main body 31, which is opposite from the case bottom portion 22, contacts the end surface 921 of the housing tubular portion 92, which is located on the case bottom portion 22 side. In this way, the position of the frame main body 31 relative to the case 20 and the rack gear 80 is stabilized.

As discussed above, (4) the motor 10 of the present embodiment includes the rack gear 80. The rack gear 80 includes the housing 90 that is the aluminum die-cast product. The housing 90 includes the housing side seal groove 900 that receives the seal member 5.

Furthermore, (5) in the present embodiment, the housing 90 of the rack gear 80 further includes the housing tubular portion 92 that has the outer wall (outer peripheral wall), which is opposed to the inner wall (inner peripheral wall) of the opposite part of the case tubular portion 21 located on the opposite side of the frame main body 31 that is opposite from the case bottom portion 22. The housing side seal groove 900 is formed at the outer wall (outer peripheral wall) of the housing tubular portion 92.

In the present embodiment, since the housing 90 of the rack gear 80 includes the housing tubular portion 92, the case 20 can be fixed to the housing 90 by the socket-spigot fitting. Furthermore, the seal member 5 is installed between the housing tubular portion 92 and the case tubular portion 21, which are used for the socket-spigot fitting, so that the socket-spigot fitting and the sealing of the opening of the case 20 can be simultaneously executed.

Furthermore, since the housing 90 is the aluminum die-cast product, the sufficient wall thickness of the housing tubular portion 92 can be ensured. Therefore, even when the seal member 5 is received in the housing side seal groove 900 of the housing tubular portion 92, it is possible to limit the deformation of the housing tubular portion 92, which would be otherwise caused by the reaction force applied from the seal member 5. Therefore, it is possible to limit deterioration of the sealing performance at the circumferential location(s) of the case 20.

Furthermore, in the present embodiment, the housing side seal groove 900 is formed at the outer wall (outer peripheral wall) of the housing tubular portion 92, and the seal member 5 is received in the housing side seal groove 900. Therefore, in comparison to a case where a seal groove is formed in the inner wall of the case tubular portion 21, the case 20 can be easily installed to the housing 90 without resulting in falling out of the seal member 5 from the seal groove.

Furthermore, in the present embodiment, the case tubular portion 21 and the case bottom portion 22 are formed integrally as the one-piece body. Furthermore, the end of the case hole 23, which is opposite from the frame 30, is closed. Therefore, sealing between the case tubular portion 21 and the case bottom portion 22 and sealing of the case hole 23 can be omitted.

Third Embodiment

Figure 5:
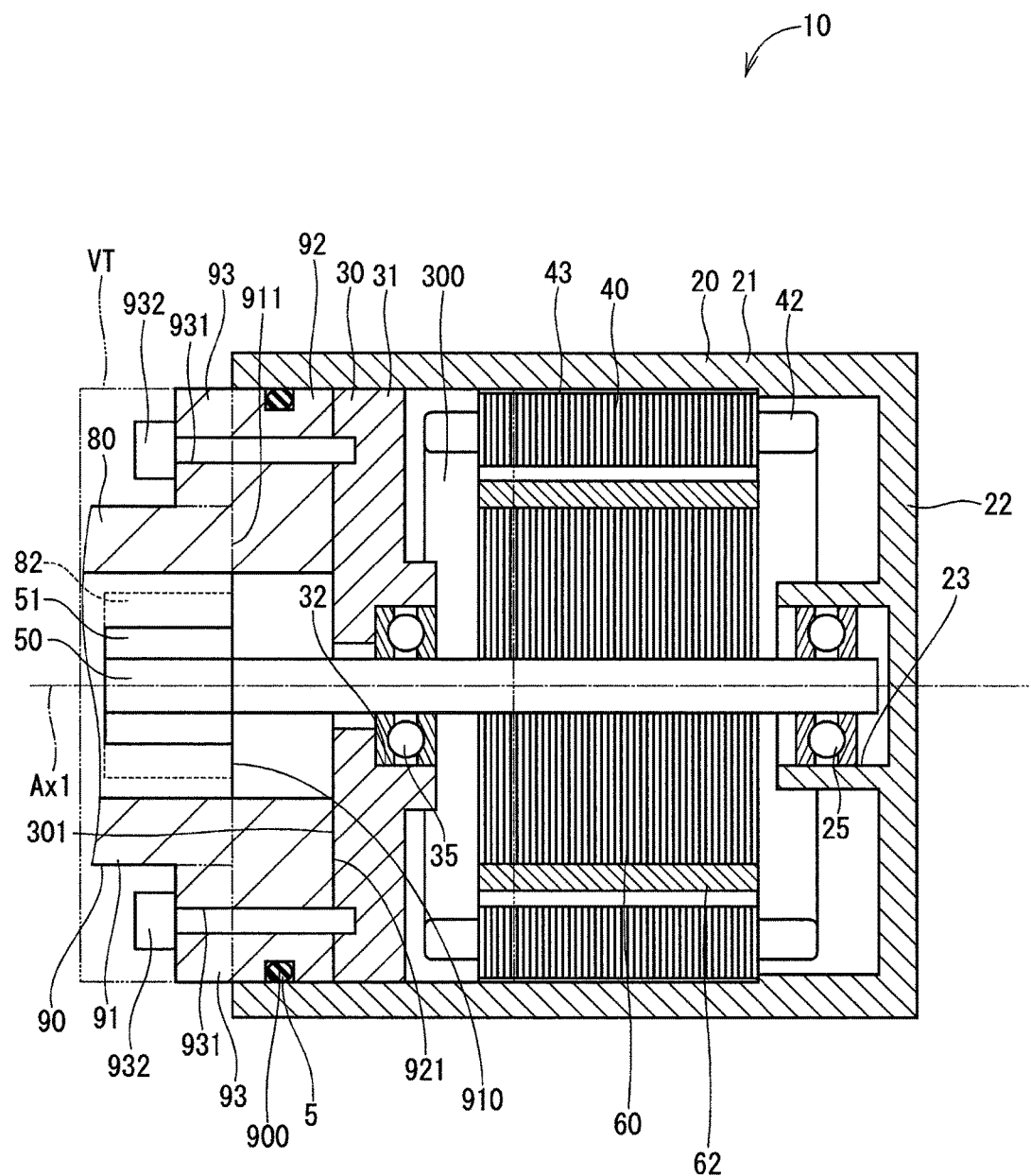
FIG. 5 is a cross sectional view of an electric motor of a third embodiment of the present disclosure.

FIG. 5 shows the motor according to a third embodiment of the present disclosure. The third embodiment differs from the second embodiment with respect to the shape of the case 20 and the shape of the rack gear 80.

In the third embodiment, the case tubular portion 21 does not include the case side fixation portion 24, which is discussed in the first and second embodiments.

The housing 90 of the rack gear 80 includes the housing main body 91, the housing tubular portion 92 and a housing side fixation portion 93.

The housing tubular portion 92 projects in a generally cylindrical tubular form from the surface 911 of the outer wall of the housing main body 91, which is located on the radially outer side of the opening 910. Similar to the second embodiment, the outer diameter of the housing tubular portion 92 is set to be equal or slightly smaller than the outer diameter of the case tubular portion 21. The outer wall (outer peripheral wall) of the housing tubular portion 92 is opposed to the inner wall (inner peripheral wall) of the opposite part of the case tubular portion 21, which is located on the opposite side of the frame main body 31 that is opposite from the case bottom portion 22.

Furthermore, the housing side seal groove 900 is formed in the outer wall (outer peripheral wall) of the housing tubular portion 92, and the seal member 5 is received in the housing side seal groove 900.

The housing side fixation portion 93 outwardly projects from the outer wall (outer peripheral wall) of the housing main body 91 in the radial direction of the housing tubular portion 92. Here, the housing side fixation portion 93, the housing tubular portion 92 and the housing main body 91 are formed integrally as a one-piece body. In FIG. 5, boundaries among the housing side fixation portion 93, the housing tubular portion 92 and the housing main body 91 are indicated by dot-dot-dash lines.

Housing side insertion holes 931 are formed in the housing side fixation portion 93 and the housing tubular portion 92.

In the present embodiment, the case 20 is fixed to the rack gear 80 such that the end part of the shaft 50, which is opposite from the case bottom portion 22, is inserted through the opening 910 of the housing main body 91, and the housing tubular portion 92 is placed at the inside of the case tubular portion 21, and the end surface 301 of the frame main body 31, which is opposite from the case bottom portion 22, contacts the end surface 921 of the housing tubular portion 92, which is located on the case bottom portion 22 side.

The housing side fixation portion 93 of the housing 90 of the rack gear 80 is fixed to the frame 30 by inserting the housing side fixing members 932 through the housing side insertion holes 931, respectively, and threadably tightening the housing side fixing members 932 into female-threaded holes, respectively, of the frame main body 31. The frame 30 is fixed to the housing 90 together with the case 20, the stator 40 and the rotor 60. In the present embodiment, each of the housing side fixing members 932 is, for example, a bolt.

In the present embodiment, the housing tubular portion 92, the housing side fixation portion 93, the housing side insertion holes 931 and the housing side fixing members 932 are located on an inner side of an imaginary cylindrical surface VT that includes the inner wall (inner peripheral wall) of the case tubular portion 21.

Furthermore, the motor 10 of the present embodiment includes a support member 43. The support member 43 is shaped into a tubular form and is formed by a thin plate made of, for example, metal. The support member 43 is placed between the stator 40 and the inner wall (inner peripheral wall) of the case tubular portion 21. The support member 43 includes a plurality of projections (not shown), each of which projects toward the inside or the outside. Therefore, the stator 40 is supported by the support member 43 such that the stator 40 is not rotatable and is not movable relative to the case tubular portion 21 in the receiving space 300.

As discussed above, (8) in the present embodiment, the housing 90 of the rack gear 80 includes the housing side fixation portion 93 that is fixed to the frame main body 31. In the present embodiment, the housing 90 is the aluminum die-cast product. Therefore, the sufficient wall thickness of the housing side fixation portion 93 can be ensured, and the housing 90 and the frame 30 can be stably fixed together.

Furthermore, (9) in the present embodiment, the housing side fixation portion 93 includes the housing side insertion holes 931. In the present embodiment, the motor 10 further includes the housing side fixing members 932 that are respectively inserted through the housing side insertion holes 931 and fix the housing side fixation portion 93 to the frame main body 31. In the present embodiment, the housing 90 is the aluminum die-cast product, so that the sufficient wall thickness of the housing side fixation portion 93 can be ensured. Thus, the housing 90 and the frame 30 can be stably fixed together.

Furthermore, in the present embodiment, since the housing 90 is the aluminum die-cast product, the housing side fixing members 932 can be inserted through the housing side fixation portion 93 from the side that is opposite from the frame 30 to fix the housing 90 and the frame 30 together. Therefore, the housing side fixation portion 93, the housing side insertion holes 931 and the housing side fixing members 932 can be placed on the inner side of the imaginary cylindrical surface VT that includes the inner wall (inner peripheral wall) of the case tubular portion 21. As a result, in comparison to the first and second embodiments, it is not required to form the projecting portion, such as the case side fixation portion 24 that radially outwardly projects from the case tubular portion 21, and thereby the size of the case 20 can be reduced, and the shape of the case 20 can be simplified.

Furthermore, (12) the motor 10 of the present embodiment includes the support member 43 that is placed between the case tubular portion 21 and the stator 40 and supports the stator 40 such that the stator 40 is not moveable relative to the case tubular portion 21. Thus, the stator 40 can be placed in a stable manner on the inner side of the case tubular portion 21.

Other Embodiments

In the first embodiment, there is described the exemplary case where the case side seal groove 200 is formed in the end surface 201 of the case tubular portion 21, which is opposite from the case bottom portion 22. Alternatively, in another embodiment of the present disclosure, a seal groove may be formed in the surface 911 of the housing main body 91 of the rack gear 80, and the seal member 5 may be received in this seal groove.

Furthermore, in the second and third embodiments, the housing side seal groove 900 is formed in the outer wall (outer peripheral wall) of the housing tubular portion 92 of the rack gear 80. Alternatively, in another embodiment of the present disclosure, a seal groove may be formed in the inner wall (inner peripheral wall) of the case tubular portion 21, which is opposed to the outer wall (outer peripheral wall) of the housing tubular portion 92, and the seal member 5 may be received in this seal groove.

Furthermore, in the first embodiment, the motor 10 of the electromechanical type has the case tubular portion 21 and the case bottom portion 22, which are formed separately from each other. Alternatively, in another embodiment of the present disclosure, the motor 10 of the electromechanical type may have the case tubular portion 21 and the case bottom portion 22, which are formed integrally as a one-piece body.

The component(s) of one or more of the above embodiments may be combined with the component(s) of another one or more of the above embodiments in any manner as long as there is no structural interfering factor. For example, the first embodiment and the second embodiment may be combined together such that the control device 70 and the case 20 are integrated together to form the motor of the electromechanical type.

Furthermore, in the above embodiments, the pulley 51 is installed to the end part of the shaft 50 to transmit the torque of the motor 10 to the rack gear 80 through the belt 82. Alternatively, in another embodiment of the present disclosure, a coupling, such as a joint, may be provided to the end part of the shaft 50 to transmit the torque of the motor 10 to the input part of the rack gear 80 through the joint.

Furthermore, in another embodiment of the present disclosure, a surface treatment for limiting corrosion may be applied to the outer wall of the case depending on the operating environment of the motor.

Furthermore, in the above embodiments, the motor 10 is entirely placed on the lower side of the upper end of the wheel 107 in the vertical direction. Alternatively, in another embodiment of the present disclosure, the motor 10 may be placed such that at least a portion of the motor 10 is placed on the upper side of the upper end of the wheel 107 in the vertical direction.

Furthermore, the motor of the present disclosure should not be limited to the motor of the electric power steering apparatus and may be a motor of another type of apparatus that have a possibility of receiving the water.

As discussed above, the present disclosure should not be limited to the above embodiments and may be embodied in various other ways without departing the scope of the present disclosure.

What is claimed is:
1. An electric motor for driving a drive subject, comprising:
  a case that is an aluminum die-cast product and includes:
    a case tubular portion that is shaped into a tubular form; and
    a case bottom portion that closes one end part of the case tubular portion;
  a frame that is an aluminum die-cast product and includes:
    a frame main body that is placed at an inside of an opposite part of the case tubular portion, which is opposite from the case bottom portion, wherein an outer wall of an outer peripheral portion of the frame main body is opposed to an inner wall of the case tubular portion, and a receiving space is formed by the frame main body, the case tubular portion and the case bottom portion; and
    a frame hole that is formed in a center part of the frame main body;
  a stator that is shaped into a ring form and is received in the receiving space, wherein the stator is coaxial with the case tubular portion and is not rotatable relative to the case tubular portion;
  a winding that is wound around the stator;

a shaft that is inserted through the frame hole and is rotatably supported by a center part of the case bottom portion and the frame hole;

a rotor that is rotatable together with the shaft, wherein an outer wall of the rotor is opposed to an inner wall of the stator, and an inner wall of the rotor is fixed to an outer wall of the shaft; and a seal member that is placed between the case tubular portion and the drive subject and liquid tightly seals between the case tubular portion and the drive subject.

2. The electric motor according to claim 1, wherein the case tubular portion includes a case side seal groove that receives the seal member.

3. The electric motor according to claim 2, wherein the case side seal groove is formed in an end surface of the case tubular portion, which is opposite from the case bottom portion.

4. The electric motor according to claim 1, further comprising the drive subject, wherein:
the drive subject includes a housing that is an aluminum die-cast product; and
the housing includes a housing side seal groove that receives the seal member.

5. The electric motor according to claim 4, wherein:
the housing includes a housing tubular portion that has an outer wall, which is opposed to the inner wall of the case tubular portion; and
the housing side seal groove is formed at the outer wall of the housing tubular portion.

6. The electric motor according to claim 1, wherein the case tubular portion includes a case side fixation portion that radially outwardly extends from an outer wall of another end part of the case tubular portion, which is opposite from the case bottom portion, while the case side fixation portion is fixed to the drive subject.

7. The electric motor according to claim 6, wherein:
the case side fixation portion includes a case side insertion hole; and
the electric motor further comprises a case side fixing member that is inserted through the case side insertion hole and fixes the case side fixation portion to the drive subject.

8. The electric motor according to claim 1, further comprising the drive subject, wherein:
the drive subject includes a housing that is an aluminum die-cast product; and
the housing includes a housing side fixation portion that is fixed to the frame main body.

9. The electric motor according to claim 8, wherein:
the housing side fixation portion includes a housing side insertion hole; and
the electric motor further comprises a housing side fixing member that is inserted through the housing side insertion hole and fixes the housing side fixation portion to the frame main body.

10. The electric motor according to claim 1, further comprising a control device that is placed on a side of the case bottom portion, which is opposite from the frame, wherein the control device controls rotation of the rotor by controlling an electric power supplied to the winding.

11. The electric motor according to claim 1, wherein the case tubular portion is formed separately from the case bottom portion.

12. The electric motor according to claim 1, further comprising a support member that is placed between the case tubular portion and the stator, wherein the support member supports the stator such that the stator is not rotatable relative to the case tubular portion.

13. An electric power steering apparatus to be installed in a vehicle, comprising:
the electric motor of claim 1; and
the drive subject that is connected to an end part of the shaft, which is opposite from the case bottom portion, while the drive subject is driven by the electric motor, wherein when the drive subject is driven, an assist torque for steering the vehicle is outputted from the electric power steering apparatus.

14. The electric power steering apparatus according to claim 13, wherein the drive subject drives a rack shaft that is connected to a wheel of the vehicle.

15. The electric power steering apparatus according to claim 14, the electric motor is placed such that at least a part of the electric motor is positioned on a lower side of an upper end of a silhouette of the wheel.

* * * * *